UNITED STATES PATENT OFFICE.

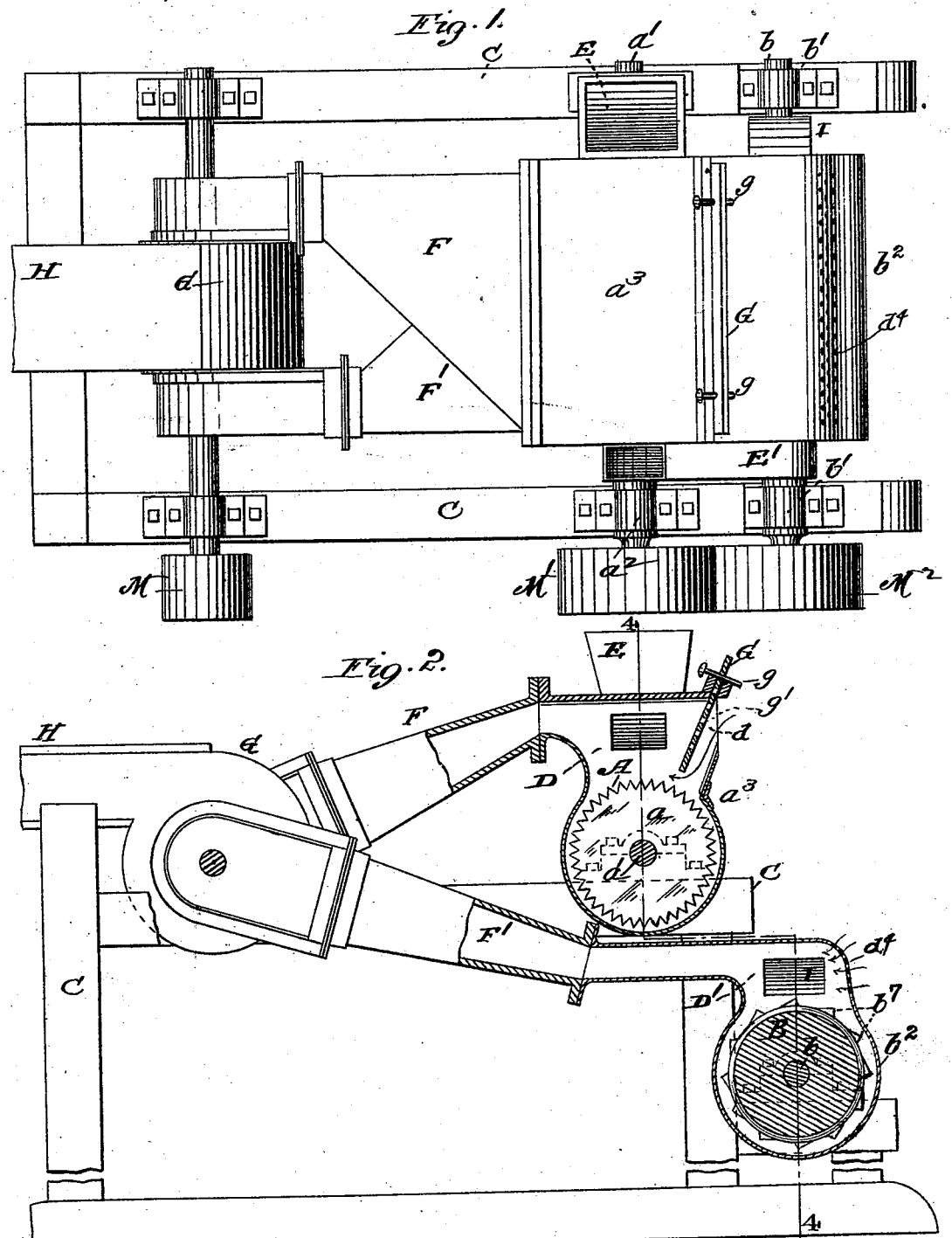

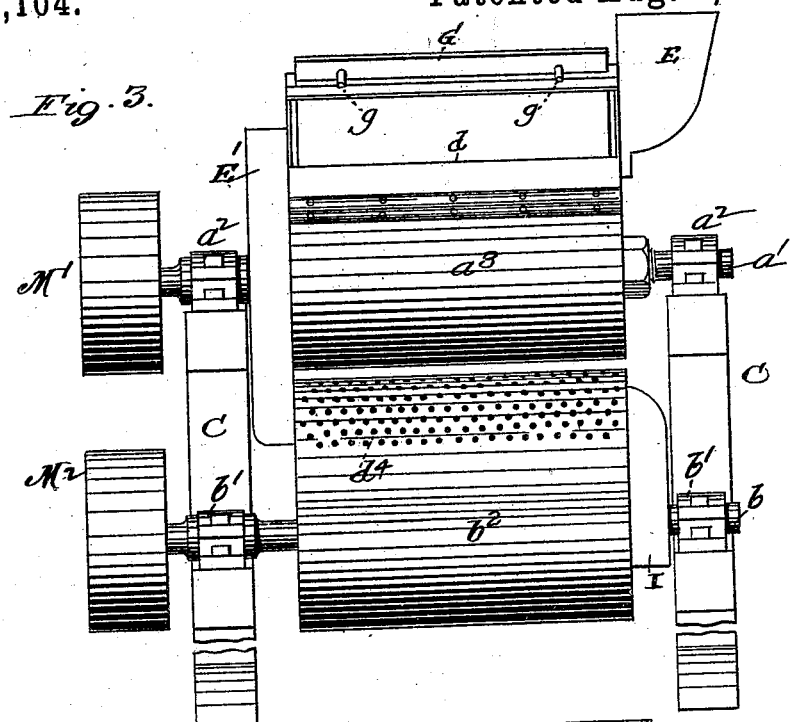
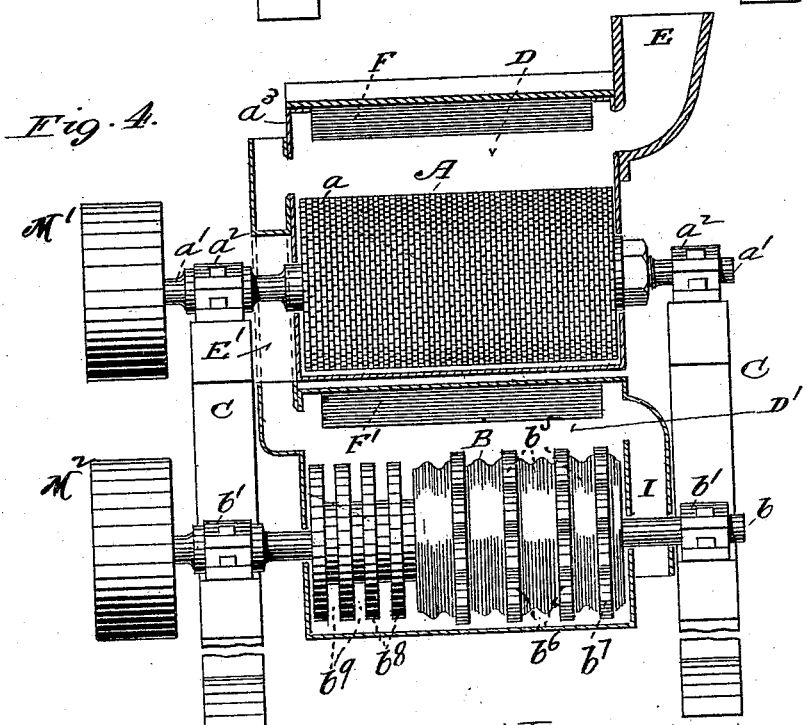

ABNER D. THOMAS, OF LITTLE ROCK, ARKANSAS, ASSIGNOR TO THE THOMAS MANUFACTURING COMPANY, OF SAME PLACE.

APPARATUS FOR DELINTING COTTON-SEED.

SPECIFICATION forming part of Letters Patent No. 503,104, dated August 8, 1893.

Application filed March 6, 1893. Serial No. 464,650. (No model.)

*To all whom it may concern:*

Be it known that I, ABNER D. THOMAS, of Little Rock, Arkansas, have made a new and useful Improvement in Apparatus for Delinting Cotton-Seed, of which the following is a full, clear, and exact description.

The improvement under consideration is designed more especially for cotton-seed. I have heretofore made an improvement in methods and apparatus for delinting seed in which the lint-bearing seed is fed into a receptacle containing a lint-cutting, or seed-abrading part which, in its general outline, is cylindrical, or approximately cylindrical, and which is arranged horizontally and adapted to be rotated in a vertical, or approximately vertical plane. The shell or casing which forms the wall of the seed-receptacle forms a support for the material while it is being acted upon by the rotating part, and the material being treated assumes an annular, or approximately annular, form around the described rotating part, and the shell or casing, opposite the surface of the rotating part, is perforated to provide an outlet for the lint which is separated from the seed. The denuded seed is worked endwise within the described annular space and is discharged through a separate outlet which is usually at the end of the receptacle. The rotating part is the means relied upon for separating the lint from the seed, and it is shaped to cause its motion to be communicated to the surrounding body of seed to cause it in turn to rotate within the annular space referred to, so that all portions of it are presented to the surface of the rotating part and all the lint-bearing seeds substantially brought directly into contact with the rotating part to be uniformly treated. The construction referred to is described in a pending application for Letters Patent, filed February 13, 1893, and numbered serially 462,109. The construction under consideration resembles the one referred to in that a horizontally arranged, rotating, cylindrical, or approximately cylindrical, lint-cutting or seed abrading part is employed in effecting the separation of the lint from the seed. But the seed is subjected first to the action of a device which is designed to separate the longer portion of the lint, and then the seed, with the shorter lint remaining thereon, is subjected a second time to the action of another device which is contrived to effect the separation of the remaining portion of the lint. The first one of the devices referred to is in its nature calculated rather to separate the lint by pulling it or cutting it from the seed; the second named device is designed more especially for effecting the separation of the lint by abrading the seed. The two devices in question are preferably contained in separate chambers, and in practice they are preferably arranged one above the other, and the products obtained from the two receptacles may be discharged in different directions and by different means, or they may be discharged jointly and by the same means.

The annexed drawings exhibit a desirable means for carrying out the improvement.

Figure 1 is a plan of the apparatus. Fig. 2 is a side elevation, partly in vertical longitudinal section, of the apparatus. Fig. 3 is a front elevation of the apparatus, and Fig. 4 is a vertical, transverse, section on the line 4—4 of Fig. 2.

The same letters of reference denote the same parts.

A represents that one of the devices to which the material to be treated is first subjected, and B represents the one to which the material is subsequently subjected.

The device, A, in practice, is a series of circular saws, $a$, fastened to a horizontal shaft $a'$, that is journaled in suitable bearings $a^2$, $a^2$, in the frame C, and inclosed by a casing $a^3$ which quite closely surrounds the described series of saws saving at the top thereof where the casing is extended upward to form a chamber, D, in which the seed to be treated is received, and held during its treatment.

E represents an inlet through which the lint-bearing seed is introduced into the chamber D, and F represents the flue through which the lint is discharged from the chamber D. The needed air for the operation is admitted to the chamber D through the inlet $d$, which is arranged at the front of the chamber, and G represents an adjustable gate which serves partly to graduate the air-supply and partly to direct the air favorably to the immediate vicinity of the saws. The gate is adjustable to enable it to be set closer to or farther from the saws, and a convenient mode of holding the gate at any desired point of adjustment is by means of a pin $g$, which can be passed through any desired one of a series of perforations, $g'$, in the gate, and allowing its ends to rest upon the top of the casing, or some shoulder thereon, and thereby suspend the gate at the desired elevation, substantially as shown. The other rotating device, B, is in practice composed of corundum, and it is secured to a horizontally-arranged shaft $b$ which is held and adjusted to be rotated in the bearings, $b'$, $b'$, in the frame C, and the part is inclosed by a casing, $b^2$, saving at the top of the part where the casing is extended, in a manner analogous to that in which the casing $a^3$ incloses the device A, to inclose a chamber, D', above the device and in which chamber the seed, after being partially treated in the chamber D, is received and therein subjected to the action of the device B.

E' represents a suitable passage or chute through which the partially treated seed is, by gravity, transferred from the chamber D to the chamber D'. The air is admitted into the chamber D', through perforations $d^4$, and F' represents a flue through which the lint is discharged from the chamber D'.

The flues F and F' connect with the air-exhausting device G, and a single escape flue, H, may suffice for the discharge of the lint to any desired point. But if desired the fan, G, may be divided, to form a double fan whose parts operate respectively in separate chambers with which the flues F, F', respectively connect, and the escape flue H, may be similarly divided and its parts may lead from the two fan chambers respectively. This last named method is preferable, in that it enables the chambers D, D', to be arranged at different distances from the fan, and this in turn enables the device B, and the parts immediately therewith connected, to be arranged in a different plane vertically from that of the device B and its associated parts and thus be made more accessible for inspection and repair.

Another advantage derived from attaching the devices A, B, to different shafts is that if desired the parts in question can be rotated at different speeds.

The saws which constitute the device A are preferably arranged immediately alongside of each other, and, alternately arranged to cause the teeth in adjoining saws to be out of line with each other. The saws are shown as of the same diameter, which construction I consider to be preferable.

The preferable shape of the device B is similar to that shown in the construction above referred to, namely a combination of channeled portions $b^5$, portions $b^6$, having projections $b^7$, smoother circular portions $b^8$, and grooves $b^9$, all relatively arranged substantially as shown, thereby providing a varied contour along which the seed is worked and tumbled in various ways in its passage from one end of the chamber D' to the other end thereof.

The outlet for the denuded seed is at I.

In operation the lint-bearing seed is delivered through the inlet E, into the chamber D where it, following the lint of least resistance, works its way along to the opposite end of the chamber and in such passage, the seed is subjected to the action of the saws, and a larger portion of the lint—the longer lint—is separated from it, and as fast as it is separated the lint, by the action of the fan is carried off through the flue F. The partially-stripped seed on reaching the farther end of the chamber D passes out into the chute E' and falls through the same into the chamber D'. The seed then works along the chamber D' to the other end thereof, and in such movement is subjected to the abrading action of the device B, and ultimately the denuded seed is discharged through the outlet I. The lint from the chamber D' is exhausted through the flue F'.

The device B may be variously shaped without departing from the principle of the improvement so long as it is adapted to separate the shorter fiber from the seed, and instead of having the deeper grooves in the part to come toward the inlet E', they may be arranged toward the outlet I.

I desire not to be restricted to any special relative arrangement of the devices A and B, and the chambers D and D' may assume any relative position which harmonizes with the relative position of the devices A and B. Nor do I wish to be restricted to circular saws in constructing the lint-cutting device A, nor again to corundum, or to any special contour, in constructing the seed-abrading device B. I prefer however in the one case to employ the saws and arranged as shown, and in the other case to use a cylinder or cylinder-like part composed partly if not wholly of corundum, and of the irregular surface shown, as as being best fitted for the purpose in question. Nor do I desire to be confined to a strictly horizontal arrangement in adjusting the devices A and B or either of them, as I have ascertained the travel of the seed is sometimes accelerated by lowering the discharge-end of the device or devices in question.

The special means for driving the devices A and B are not shown in the drawings. But in practice a belt is carried around the various pulleys M, M', M², which are attached to the various shafts as shown, so as to operate the devices A, B, at the desired rates. And if desired the construction can be such as to cause the devices to be rotated at different rates. The pulley which drives the belt referred to is not shown.

I claim—

1. In a cotton seed delinter the combination of a casing having a cylindrical lower portion, a lint cutting cylinder adapted to revolve in said lower portion, said casing having an unobstructed chambered portion above said cylinder wherein the seed may be thoroughly agitated, an air-inlet in one side of said chamber, and a lint-outlet in the opposite side of said chamber, and means for producing a current of air from said air-inlet through the chamber to said outlet, substantially as described.

2. In a cotton seed delinter the combination of a revolving cylinder, a casing therefor having a free unobstructed chambered portion above said cylinder in which the seed is agitated, an air-inlet in one side of the chamber, a lint-outlet in the opposite side of the chamber, an outlet for the denuded seed, and means for producing a current of air through said chamber, whereby the lint is separated from the seed as the latter are agitated in the chamber, substantially as described.

3. In a cotton seed delinter the combination of a revolving cylinder, a casing therefor having an unobstructed chambered portion above said cylinder in which the seed is agitated, an air-inlet in one side of the chamber, a lint outlet in the opposite side of the chamber, an outlet for the denuded seed, means for producing a current of air through said chamber, and means for regulating said air current, whereby the lint is separated from the seed as the latter are agitated in the chamber, substantially as described.

4. The combination in a device for separating lint from cotton seed of a lint cutting or detaching device, and a separate means for abrading the seed connected thereto, whereby, as the longer lint is detached, the partly denuded seed is discharged into the abrading device, an exhaust or lint-conveying passage connected to each of said devices and separated from each other throughout, and means for producing a current of air through such passages, substantially as described.

Witness my hand this 25th day of February, 1893.

ABNER D. THOMAS.

Witnesses:
  GEO. J. LOW,
  A. H. THOMAS.